United States Patent
Nguyen et al.

(10) Patent No.: US 10,029,445 B2
(45) Date of Patent: Jul. 24, 2018

(54) ENVIRONMENTALLY FRIENDLY COMPOSITE FOILS

(71) Applicant: SXWELL AUSTRALIA PTY. LTD., Richmond, Victoria (AU)

(72) Inventors: KC Nguyen, Dothan, AL (US); Chayaporn Pongthanomsak, A. Phunphin Suratthani (TH); Phuttatida Tanjaroon, A. Phunphin Suratthani (TH); Chayapon Ngowprasert, A. Phunphin Suratthani (TH); Cauvathur Seethapathy Rajendran, Khwang Klongtoey (TH)

(73) Assignee: Lifestyles Healthcare Pte. Ltd., Singapore (SG)

( * ) Notice: Subject to any disclaimer, the term of this patent is extended or adjusted under 35 U.S.C. 154(b) by 559 days.

(21) Appl. No.: 14/608,984

(22) Filed: Jan. 29, 2015

(65) Prior Publication Data

US 2015/0217537 A1    Aug. 6, 2015

Related U.S. Application Data

(60) Provisional application No. 61/934,195, filed on Jan. 31, 2014.

(51) Int. Cl.
*B32B 3/10*   (2006.01)
*B29C 47/06*  (2006.01)
(Continued)

(52) U.S. Cl.
CPC ............... *B32B 7/12* (2013.01); *B32B 23/04* (2013.01); *B32B 23/08* (2013.01); *B32B 27/06* (2013.01);
(Continued)

(58) Field of Classification Search
CPC .............. B29C 47/0021; B65D 65/466; Y10T 428/24331; C08J 2301/02
(Continued)

(56) References Cited

U.S. PATENT DOCUMENTS

| | | | |
|---|---|---|---|
| 5,505,900 A | * | 4/1996 | Suwanda .................. D01F 6/04 264/210.7 |
| 6,903,161 B2 | | 6/2005 | Morris |

(Continued)

FOREIGN PATENT DOCUMENTS

| | | |
|---|---|---|
| EP | 2141191 A1 | 1/2010 |
| JP | 2009035003 A | 2/2009 |

OTHER PUBLICATIONS

International Search Report and Written Opinion dated May 29, 2015 for PCT Application No. PCT/AU2015/000040.
(Continued)

*Primary Examiner* — Ellen S Wood
(74) *Attorney, Agent, or Firm* — Servilla Whitney LLC

(57) ABSTRACT

An environmentally-friendly composite foil that includes a first biocompostable and/or biorenewable cellulose-based film comprising a moisture barrier coating; a second biocompostable and/or biorenewable cellulose-based film comprising a thin metallized surface, disposed adjacent to the first biocompostable and/or biorenewable cellulose-based film, having a bio-adhesive disposed between the first biocompostable and/or biorenewable cellulose-based film and the second biocompostable and/or biorenewable cellulose-based film; and a third biocompostable and/or biorenewable film comprising a sugar and/or a corn-based film, disposed adjacent to the biocompostable and/or biorenewable cellulose-based second film.

26 Claims, 2 Drawing Sheets

(51) Int. Cl.
- *B32B 15/09* (2006.01)
- *B32B 27/06* (2006.01)
- *B32B 7/12* (2006.01)
- *B32B 23/04* (2006.01)
- *B32B 23/08* (2006.01)
- *B32B 27/08* (2006.01)
- *B32B 27/32* (2006.01)
- *B32B 27/36* (2006.01)
- *B32B 27/18* (2006.01)
- *B65D 65/46* (2006.01)
- *B65D 75/30* (2006.01)

(52) U.S. Cl.
CPC .............. *B32B 27/08* (2013.01); *B32B 27/18* (2013.01); *B32B 27/32* (2013.01); *B32B 27/36* (2013.01); *B65D 65/466* (2013.01); *B65D 75/30* (2013.01); *B32B 2255/10* (2013.01); *B32B 2255/205* (2013.01); *B32B 2255/26* (2013.01); *B32B 2307/31* (2013.01); *B32B 2307/71* (2013.01); *B32B 2307/7163* (2013.01); *B32B 2307/7246* (2013.01); *B32B 2439/80* (2013.01); *Y10T 428/1352* (2015.01); *Y10T 428/3179* (2015.04); *Y10T 428/3188* (2015.04); *Y10T 428/31909* (2015.04); *Y10T 428/31978* (2015.04)

(58) Field of Classification Search
USPC .......................................... 428/138; 427/331
See application file for complete search history.

(56) References Cited

U.S. PATENT DOCUMENTS

| | | |
|---|---|---|
| 7,802,575 B2 | 9/2010 | Wish |
| 8,025,061 B2 | 9/2011 | Wish |
| 2002/0127358 A1 | 9/2002 | Berlin et al. |
| 2008/0160327 A1 | 7/2008 | Knoerzer et al. |
| 2011/0171461 A1 | 7/2011 | Sanfilippo et al. |
| 2013/0011631 A1* | 1/2013 | Sakellarides ........... B32B 27/06 428/195.1 |

OTHER PUBLICATIONS

"NatureFlex NKME", Innovia Films Group, 2 Pages.
"NatureFlex NKR", Innovia Films Group, 1 Page.
DuPontTM Sulyn Extrusion Guide, 2003, 21 pgs.
NatureFlexTM NKME Data, innovia Films, 2 pgs.
NatureFlexTM NKR Data, innovia Films, 2 pgs.
Tamboli, S. M., et al., "Crosslinked polyethylene", Indian Journal of Chemical Technology vol. 11, Nov. 2004, 853-864.

* cited by examiner

ENVIRONMENTALLY FRIENDLY COMPOSITE FOILS

CROSS-REFERENCE TO RELATED APPLICATION

This application claims the benefit of U.S. Provisional Application No. 61/934,195 under 35 USC 119(e), filed Jan. 31, 2014, and is incorporated by reference in its entirety.

BACKGROUND

Field of the Invention

Embodiments of the present invention generally relate to packaging. More specifically, embodiments of the invention relate to environmentally-friendly composite foils.

Description of the Related Art

Gloves, such as examination and surgical gloves, and other prophylactic devices, such as condoms, are typically made of polymeric materials and provide protection against chemicals, abrasions, germs, viruses, and microbes among many uses. Surgical gloves having high resistance to tears while remaining flexible so that intricate procedures, during which scalpels, forceps, hemostats, and the like are used, are desirable. However, when polymeric articles are exposed to environmental factors, such as oxygen, ozone, moisture, visible and ultraviolet light, the integrity of the devices can be compromised. Moreover, gloves for medical industries and condoms are sterilized and must remain sterile until use. Therefore, adequate packaging for these articles is important. Similarly, finger cots, contact lenses, and other rubber or polymeric articles, require protective barrier packaging.

Current packaging for such articles contain high amounts of non-environmentally friendly foils, i.e., contain little or no renewable content, such as foils consisting of metallized biaxially oriented polypropylene and/or thick aluminum layers and cellophane, which do not break down or compost quickly in landfills. Moreover, many municipal recycling programs, such as curbside recycling programs, which have grown increasingly strict, mandate the recyclability of packaging. Furthermore, many packaging foils require expensive delamination processing of layers or films before recycling is possible.

With the foregoing in view, attempts have been made to provide recyclable packaging, for example, compostable packaging. A biodegradable material may be defined as a material that microbes in the environment can break down and use as a food source, e.g., a biodegradable material can be mineralized by micro-organisms. Moreover, biodegradable materials are not necessarily bio-based. Biocompostable packaging is certified to Industrial Composting norms, e.g., EN13432, ASTM D6868, and ASTM D6400, by Din Certco and the Biodegradable Products Institute (BPI). According to the BPI, to be certified, a product must be capable of disintegrating rapidly (for example, 90% of the organic carbon within the material becomes converted to carbon dioxide within 180 days), depending on heat, aeration, and size of particle sizes or product during the composting process, biodegrade quickly under composting conditions, not reduce the value or utility of the finished compost, i.e., support plant life, and not contain high amounts of regulated metals.

Thin, robust, composite foils capable of providing protection from oxygen, ozone, moisture, visible and ultraviolet light, and the like, and being biodegradable, biorenewable, and/or biocompostable represent advances in the art.

SUMMARY

An environmentally-friendly composite foil that includes a first biocompostable and/or biorenewable cellulose-based film comprising a moisture barrier coating; a second biocompostable and/or biorenewable cellulose-based film comprising a thin metallized surface, disposed adjacent to the first biocompostable and/or biorenewable cellulose-based film, having a bio-adhesive disposed between the first biocompostable and/or biorenewable cellulose-based film and the second biocompostable and/or biorenewable cellulose-based film; and a third biocompostable and/or biorenewable film optionally comprising a sugar and/or a corn-based film, disposed adjacent to the biocompostable and/or biorenewable cellulose-based second film, substantially as shown in and/or described in connection with at least one of the figures, as set forth more completely in the claims, are disclosed. Various advantages, aspects, and novel features of the present disclosure, as well as details of exemplary embodiments thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings and disclosure depict exemplary embodiments of the invention and are therefore not to be considered limiting of the scope of the particular forms described, for those skilled in the art will recognize additional embodiments of the present invention, which covers all modifications, equivalents, and alternatives within the spirit and scope of the present invention as defined by the appended claims.

The headings used herein are for organizational purposes only and are not meant to limit the scope of the description or embodiments according to the invention. As used throughout this application, the word "may" is used in a permissive sense, meaning having the potential to, rather than the mandatory sense. Similarly, "include," "including," and "includes" mean including, but not limited to.

DETAILED DESCRIPTION

Embodiments according to the present invention include various biodegradable, biorenewable, and/or biocompostable polymeric films laminated to form composite foils for use as packaging, such as for gloves, condoms, finger cots, and the like, as well as for peelable layers such as closures for blister packaging, which can be used for, e.g., food, contact lenses, and electronics. Some embodiments include a plurality of films, one or more of which is an environmentally-friendly film. In this context, environmentally-friendly means biodegradable, biorenewable, and/or biocompostable films, which are formed from renewable resources, such as wood pulp, e.g., cellulose-based films, corn-based, sugar cane, and the like according to some exemplary embodiments of the invention. These composite foils break down into carbon dioxide, water and biomass at a similar rate as cellulose, disintegrating so that the remnants of the composite foil are substantially indistinguishable in a compost, i.e., is not readily visible and need not be screened out, and are not eco-toxic, i.e., degradation of the composite foil does not produce any toxic material and the compost can support plant growth.

Figure 1:
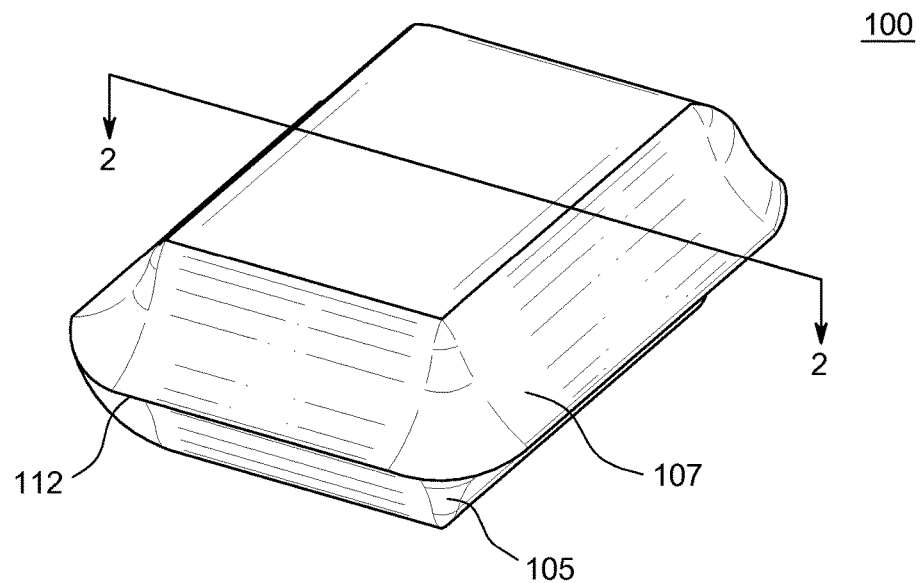
FIG. 1 depicts a perspective view of packaging, according to embodiments of the present invention.

FIG. 1 depicts a perspective view of packaging 100, according to embodiments of the present invention. The packaging 100 comprises a first composite foil 105 and a second composite foil 107, as described more fully below. As shown, the first composite foil 105 and the second composite foil 107 are joined at a peripheral edge 112, such as by heat sealing or adhesives, as is known to those in the art. The packaging 100 includes an internal chamber, discussed below, for storing an article, such as a polymeric article, e.g., condoms, gloves, finger cots, and the like. The first composite foil 105 and the second composite foil 107 comprise two or more films and are manufactured by lamination processes, such as extrusion lamination or dry lamination. For example, extrusion lamination comprises extruding a molten polymeric film, which adheres and penetrates another film, for e.g., a substrate film, and sometimes includes an anchoring coating disposed between the film and substrate film, which is pressed between two nip rollers.

Dry lamination comprises the use of an adhesive. Embodiments of the present invention comprise a bio-adhesive, which may be a water-based adhesive, for example, EPOTAL Eco, manufactured by BASF Corp., applied to either the film or the substrate film, pressing the film and substrate film together between rollers, for example, at 10-18 MPa and a temperature ranging from approximately 70-120° C. and a roll speed of, for example, 8-50 m/minute and driving off a solvent, i.e., water, within the adhesive, to form a composite foil. Composite foils can have additional films added by repeating either lamination process to incorporate the additional films, as discussed below. Alternatively, calendering processes can be used to join several films to form a composite foil.

Figure 2:
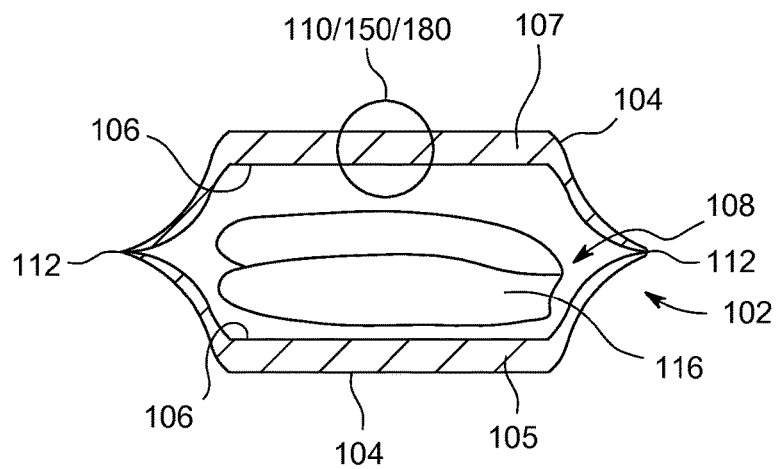
FIG. 2 depicts a cross-section taken along line 2-2 of the packaging of FIG. 1, according to embodiments of the invention.

FIG. 2 depicts a cross-section 102 taken along line 2-2 of the packaging 100 of FIG. 1, according to embodiments of the invention. The cross-section 102 of packaging 100 shows a first composite foil 105 comprising an external surface 104 and an internal surface 106 joined with a second composite foil 107 at a peripheral edge 112. The second composite foil 107 also comprises an external surface 104 and an internal surface 106 Alternative close-up views 110, 150, and 180 of the first composite foil 105 or the second composite foil 107 are shown and described below to depict alternative composite foils. A typical wall thickness of the cross-section 110 of the first composite foil 105 or the second composite foil 107 is, for example, approximately 60 to 100 microns. In some exemplary embodiments according to the invention, a wall thickness of the first composite foil 105 or the second composite foil 107 ranges between approximately 66 and 81 microns.

The first composite foil 105 and the second composite foil 107 are peripherally adhered, for example, by heat sealing or with an adhesive, such as a bio-adhesive as described herein, to define an internal chamber 108. The internal chamber 108 can be used to house and protect articles, such as polymeric articles, e.g., gloves, finger cots, or the like. At least one exemplary embodiment of the packaging 100 is used to package a condom 116. In some embodiments, the internal chamber 108 may further house additional packaging agents, i.e., desiccants, lubricants, anti-tack agents, storage liquids, saline solutions, and/or the like. In some embodiments of the invention, the first composite foil 105, the second composite foil 107 or any composite foil described herein, can be used as a peelable foil (not shown) for use with blister packaging and containers, such as is used for contact lenses as well as food, pharmaceuticals, electronics, and/or the like.

Figure 3:
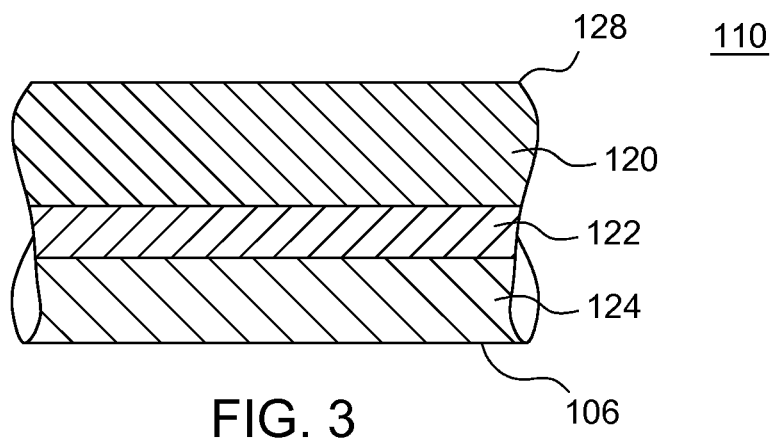
FIG. 3 depicts a close-up view of the first composite foil of FIG. 2, according to embodiments of the invention.

FIG. 3 depicts a close-up view 110 of the first composite foil 105 or the second composite foil 107 of FIG. 2, according to embodiments of the invention. The packaging 100 comprises a multi-layered composite foil, in accordance with embodiments of the invention. In some embodiments of the invention, the first composite foil 105 comprises a first film 120, a second film 122, a third film 124, and optionally a fourth film (not shown). The first composite foil 105, comprising the first film 120, the second film 122, the third film 124, and the optional fourth film are bonded together by lamination processes, such as extrusion lamination or dry lamination as discussed herein. In some embodiments, the first composite foil 105 comprises a thin layer of ink 128 printed on the outer most film, e.g., the first film 120 as shown. In some embodiments, the internal surface 106 contacts the article housed within the packaging 100, i.e., a condom, glove, and/or the like.

In some embodiments of the invention, the internal most film, i.e., the third film 124, disposed near the internal chamber (not shown), comprises an ionically crosslinked polyethylene polymer, which is, in some embodiments, an ionically crosslinked copolymer sold under the trade name SURLYN®, as manufactured and marketed by the E.I. DuPont DeNemours & Co., which is a copolymer of ethylene and methacrylic acid (E/MAA) which has been partially reacted with metallic salts to form ionic crosslinks between the acid groups within a chain, or between neighboring chains. (Ionically crosslinked structures). As depicted, the second film 122 is disposed between the first film 120 and the third film 124 and comprises, for example, a polyethylene material, such as a low density polyethylene (LDPE) or linear low density polyethylene (LLDPE). The first film 120 comprises a biodegradable and/or biocompostable material, for example, a cellulose-based film, a moisture barrier coating, and a thin metallized surface thereon. The first film 120 can be adjacent to the second film 122 or further comprise the thin metallized film or have an ink layer printed thereon. In some embodiments, the first film 120 comprises a metallized compostable film that includes a metallized surface having a moisture barrier coating disposed thereon, a cellulose-based film, which may be, for example, wood pulp, disposed on the moisture barrier film, and a moisture barrier heat sealable film disposed on the cellulosic-based film. At least one exemplary embodiment of the invention comprises wherein the first film 120 is a NatureFlex™ NKME film, which has a metallized surface, manufactured by Innovia Films, which optionally has ink for decoration, etc., printed thereon. NatureFlex™ NKME film has the following specific structure: a metallized surface, on which a moisture barrier coating is adhered, on which a cellulose film is attached, on which a moisture barrier heat-seal coating is disposed. Also, some embodiments of the invention comprise an optional layer, which is an overprinted varnish, approximately 2 microns thick, which may be applied and subsequently dried, for example, by a roller coating method, on top of the ink, if any, to protect the ink from delamination. In some exemplary embodiments, the first film 120 is approximately 20-30 microns thick, the second film 122 is 15 microns thick, and the third film 124 is approximately 25 microns thick, producing a film approximately 72 microns thick and having a biorenewable and/or biocompostable content of approximately 46%.

The environmentally-friendly composite foils according to the invention can be made by the following steps. As discussed above, the first film 120 may be supplied with printing thereon. If printing is not supplied but is desired, an ink and an overprint varnish in solution, having a viscosity of approximately 10-25 cps, is applied to the surface of the first film 120, which may be subsequently dried in an oven at approximately 50-70° C. The first film 120, the second film 122, and the third film 124 may then be laminated together in any order. For example, the first film 120, the metallized compostable film, as described above, and the second film 122, the polyethylene film, are laminated together. The second film 122 is extruded from an extrusion machine operating at, for example, a screw speed of approximately 40-50 RPM (depending on the diameter of the extrusion barrel and the plasticating screw disposed therein), as known to those in the art, through a heated die, heated at approximately 280-360° C. and is, in some embodiments, 300-350° C. The second film 122 and the first film 120 are pressed together by counter-rotating nip rollers between, for example, 90-120 m/minute and in some embodiments, 100-110 m/min. The first film 120 and the second film 122, now laminated together, are delivered to a drying oven at approximately 60-90° C. and is, in some embodiments, 65-85° C. and chill rollers at approximately 20-30° C. The third film 124, e.g., the SURLYN® film, is then laminated with the first film 120 and the second film 122 using a similar process. The SURLYN® film may be extruded from an extrusion machine operating at, for example, 55-65 RPM and through an extrusion die ranging from 280-320° C. and is 300-305° C. in some exemplary embodiments.

Figure 4:
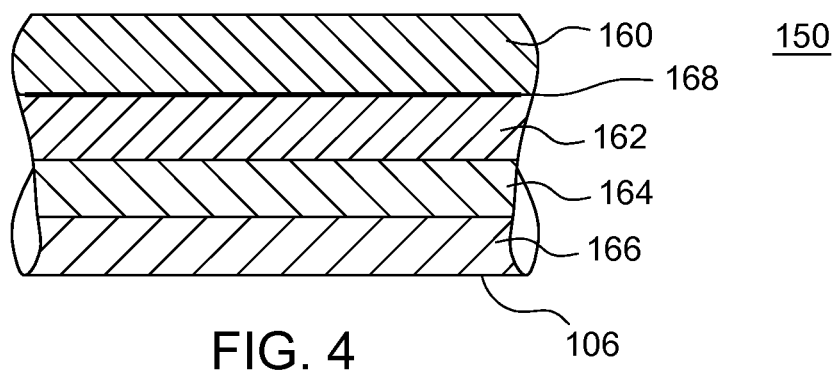
FIG. 4 depicts a close-up view of a first alternative composite foil of FIG. 2, according to embodiments of the invention.

FIG. 4 depicts a close-up view 150 of a first alternative composite foil of FIG. 2, according to embodiments of the invention. The close-up view 150 comprises a composite foil, comprising a plurality of films, for example, a first film 160, a second film 162, and a third film 164, which are bonded together by lamination processes, such as extrusion lamination or dry lamination comprising a bio-adhesive as described herein and as are known to those in the art. The first film 160 comprises a cellulose-based film, disposed as an outer film, and optionally comprising one or more moisture barrier coatings. In some embodiments, the internal surface 106 contacts the article housed within the packaging 100, i.e., a condom, glove, and/or the like.

In some embodiments, the first film 160 is a transparent high barrier heat sealable compostable film comprising a release wash coating disposed on a moisture barrier heat sealable coating which has a cellulosic-based film disposed thereon and another moisture barrier heat sealable coating disposed on the cellulosic-based film. One such first film 160 is NatureFlex™ NKR film, comprising a moisture barrier, for example, a minimal amount of poly (vinylidene chloride), manufactured by Innovia Films. NatureFlex™ NKR film has the following specific structure: a release wash-coat, on which a moisture barrier heat-seal coating is disposed, on which a cellulose film is attached, on which a moisture barrier heat-seal coating is disposed. A second film 162, laminated adjacent to the first film 160, comprises biodegradable and biocompostable materials, which is, in some embodiments, NatureFlex™ NKME manufactured by Innovia Films, as described above. In some exemplary embodiments, a bio-adhesive, such as a water-based adhesive as described above, is optionally disposed between the first film 160 and the second film 162. Also, in some embodiments, a layer of ink 168, approximately 2-3 microns thick, is disposed on the first film 160 or on the third film 164. The third film 164 is laminated adjacent to the second film 162 and comprises a polyethylene film, such as an LDPE or LLDPE, as described above. A fourth film 166 is laminated optionally adjacent to the third film 164 and comprises an ionically crosslinked polyethylene material, for example a copolymer of ethylene and methacrylic acid (E/MAA) such as SURLYN®, at processing conditions similar to those described above. Also, as described above, an overprinted varnish may be disposed as an additional outer layer. Furthermore, in some embodiments, the layer of ink 168 can be disposed on the bottom of the first film 160, i.e., on the reverse configuration so that, for example, text, can be read by a viewer. If the layer of ink 168 is disposed between films, no overprinted varnish necessary. In some exemplary embodiments, the first film 160 is approximately 19 microns thick, the second film 162 is approximately 20 microns thick, the third film 164 is approximately 15 microns thick, and the fourth film 166 is approximately 25 microns thick producing a composite foil approximately 81-84 microns thick and having a bio-renewable or bio-compostable content of approximately 48%.

Figure 5:
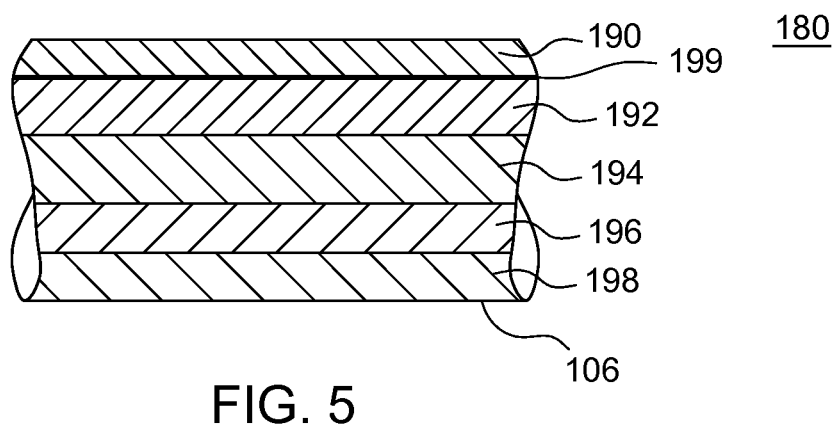
FIG. 5 depicts a close-up view of a second alternative composite foil of FIG. 2, according to embodiments of the invention.

FIG. 5 depicts a close-up view 180 of a second alternative composite foil of FIG. 2, according to embodiments of the invention. The second alternative composite foil of close-up view 180 is manufactured employing lamination processes, such as extrusion lamination or dry lamination as described above. In some exemplary embodiments, a layer 190 comprises an overprinted varnish, which produces a classic matte finish, on a first film 192. In at least one embodiment of the invention, the first film 192 comprises a biorenewable and/or biocompostable material NatureFlex™ NKR, as described above. The second alternative composite foil further comprises a second film 194 including a biodegradable and/or biocompostable material, such as NatureFlex™ NKME film, as described above, which is dry laminated with a bio-adhesive, as described above, to the first film 192. The second film 194 has, for example, a thin aluminum coating. In some embodiments, the aluminum coating on the second film 194 is approximately 10 angstroms thick. Moreover, the aluminum coating may alternately be on the first film 192 or a third film 196. The second film 194 may have the metallized surface adhered with the bio-adhesive to the first film 192 or the third film 196. The layer 190, the first film 192, and the second film 194 are bonded by extrusion lamination with a third film 196 and, optionally, a fourth film 198 to form a composite foil, as depicted in the cross-section 180. In some embodiments, the internal surface 106 contacts the article housed within the packaging 100, i.e., a condom, glove, and/or the like. The third film 196 comprises a biorenewable and/or biocompostable material, such as a sugar based material. Such sugar based materials may be polybutylene succinate (PBS) or polybutylene succinate adipate (PBSA), each of which is produced from renewable sources, such as sorghum, corn, sugar cane, and/or the like.

In some embodiments, the third film 196 comprises both PBS and PBSA, for example, wherein the ratio of PBS to PBSA ranges from 0.1-100% or any range therebetween. In some embodiments, the PBSA is FD92WD and the PBS is FZ91PD, manufactured by the Mitsubishi Chemical Corp. In some embodiments, the third film 196 includes up to approximately 2% anti-oxidant, such as a hindered phenol or bisphenol A. In at least one exemplary embodiment, the anti-oxidant is grade FZ81AN-MB, manufactured by the Mitsubishi Chemical Corp. Also, in some exemplary embodiments, the layer 190, such as an overprinted varnish, ranges from approximately 0.5-3 microns; and, in some exemplary embodiments, is 2 microns thick, the first film 192 is approximately 19 microns thick, the second film 194 is approximately 20 microns thick, the optional layer of ink 199 is approximately 2 microns thick, the third film 196 ranges from 0-25 microns thick and the fourth film 198 ranges from 0-25 microns thick. In at least one exemplary embodiment, the third film 196 is approximately 12.5 microns thick, and the fourth film 198 is approximately 12.5 microns thick, producing a composite foil approximately 66-69 microns thick having a biorenewable and/or biocompostable content of approximately 90% or more. In some embodiments, the first film 192 is dry laminated with the second film 194, using a bio-adhesive and the third film 196 is laminated to the first film 192 and the second film 194 via an extrusion process, as discussed herein. Also, in some embodiments, ink can be disposed on either side of the first film 192.

Although only a few exemplary embodiments of the present invention have been described in detail above, those skilled in the art will readily appreciate that many modifications are possible in the exemplary embodiments without materially departing from the novel teachings and advantages of this invention.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4 . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

Publications and references, including but not limited to patents and patent applications, cited in this specification are herein incorporated by reference in their entirety and cited as if each individual publication or reference were specifically and individually indicated to be incorporated by reference herein as being fully set forth.

The foregoing description of embodiments of the invention comprises a number of elements, devices, machines, components and/or assemblies that perform various functions as described. These elements, devices, machines, components and/or assemblies are exemplary implementations of means for performing their respectively described functions. While the foregoing is directed to embodiments of the present invention, other and further embodiments of the invention may be devised without departing from the basic scope thereof.

What is claimed is:

1. An environmentally-friendly composite foil, comprising:
    a first biocompostable and/or biorenewable cellulosic film comprising a moisture barrier coating;
    a second biocompostable and/or biorenewable cellulosic film comprising a thin metallized surface, disposed adjacent to the first biocompostable and/or biorenewable cellulosic film, having a bio-adhesive disposed between the first biocompostable and/or biorenewable cellulosic film and the second biocompostable and/or biorenewable cellulosic film; and
    a third biocompostable and/or biorenewable film comprising a sugar and/or a corn-based film, disposed adjacent to the biocompostable and/or biorenewable cellulosic second film.

2. The environmentally-friendly composite foil of claim 1, wherein the sugar and/or corn-based film comprises at least one of polybutylene succinate adipate or polybutylene succinate.

3. The environmentally-friendly composite foil of claim 1, wherein the third biocompostable and/or biorenewable film comprises an anti-oxidant.

4. The environmentally-friendly composite foil of claim 1, wherein the third biocompostable and/or biorenewable film comprises polybutylene succinate adipate, polybutylene succinate, and an anti-oxidant.

5. The environmentally-friendly composite foil of claim 1, further comprising a layer of ink disposed between the first biocompostable and/or biorenewable cellulosic film and the bio-adhesive.

6. The environmentally-friendly composite foil of claim 1, wherein a total renewable carbon content of the environmentally-friendly composite foil is at least 90 percent.

7. An environmentally-friendly composite foil, comprising:
    a first biocompostable and/or biorenewable cellulosic film that is approximately 30 microns in thickness, comprising a metallized surface having a moisture barrier coating;
    a second film, wherein the second film comprises low density polyethylene polymer that is approximately 15 microns in thickness disposed on the first biocompostable and/or biorenewable cellulosic film; and
    a third film, wherein the third film comprises an ionically crosslinked polyethylene polymer that is approximately 25 microns in thickness, disposed adjacent to the second film, wherein the second film is disposed between the first biocompostable and/or biorenewable cellulosic film and the third film, wherein a 2 micron thick ink layer and 5 micron thick varnish is optionally disposed on the first biocompostable and/or biorenewable cellulose-based film, producing an environmentally-friendly composite foil that ranges from approximately 70 to 77 microns in thickness.

8. The environmentally-friendly composite foil of claim 7, further comprising a fourth biocompostable and/or biorenewable cellulosic film disposed on the first biocompostable and/or biorenewable cellulosic film.

9. The environmentally-friendly composite foil of claim 8, wherein a bio-adhesive layer is disposed between the fourth biocompostable and/or biorenewable cellulosic film and the first biocompostable and/or biorenewable cellulosic film.

10. The environmentally-friendly composite foil of claim 7, wherein the moisture barrier coating is located between the metalized surface and the cellulosic film on one surface of the cellulosic film, and wherein a moisture barrier heat sealable coating is further disposed on a second surface of the cellulosic film opposite the moisture barrier coating.

11. The environmentally-friendly composite foil of claim 7, wherein the first biocompostable and/or biorenewable cellulose-based film comprises a film having the following structure: a metallized surface, on which a moisture barrier coating is adhered, on which a cellulose film is attached, on which a moisture barrier heat-seal coating is disposed.

12. The environmentally-friendly composite foil of claim 7, wherein a total carbon content of the environmentally-friendly composite foil is at least 46 percent.

13. The environmentally-friendly composite foil of claim 8, wherein the fourth film is at least one of: a film having the following structure: a metallized surface, on which a moisture barrier coating is adhered, on which a cellulose film is attached, on which a moisture barrier heat-seal coating is disposed or a film having the following structure: a release wash-coat, on which a moisture barrier heat-seal coating is disposed, on which a cellulose film is attached, on which a moisture barrier heat-seal coating is disposed.

14. An environmentally-friendly composite foil, comprising;
a first film including an ionically crosslinked polyethylene material;
a second film including a low density polyethylene polymer laminated adjacent to the first film;
a metallized third film including a biodegradable cellulosic material laminated adjacent to the second film; and
a fourth film including a biodegradable cellulosic moisture-barrier material comprising poly(vinylidene chloride), laminated adjacent to the third film.

15. The environmentally-friendly composite foil of claim 14, wherein a total renewable carbon content is at least 48 percent.

16. The environmentally-friendly composite foil of claim 14, further comprising a bioadhesive disposed between the third film and the fourth film.

17. An environmentally-friendly packaging comprising:
a first environmentally-friendly composite foil of claim 14; and
a second environmentally-friendly composite foil of claim 14 peripherally adhered to the first environmentally-friendly composite foil to define an internal chamber for storing a polymeric article between the first environmentally-friendly composite foil and the second environmentally-friendly composite foil, wherein the ionically crosslinked polyethylene material of each first film including of each of the first and second environmentally-friendly composite foils form an internal surface of the environmentally friendly packaging.

18. The environmentally-friendly packaging of claim 17, wherein the polymeric article comprises: a condom, a glove, or a finger cot.

19. An environmentally-friendly packaging, comprising:
a first environmentally-friendly composite foil of claim 7; and
a second environmentally-friendly composite foil of claim 7 peripherally adhered to the first environmentally-friendly composite foil to define an internal chamber for storing a polymeric article between the first environmentally-friendly composite foil and the second environmentally-friendly composite foil, wherein the ionically crosslinked polyethylene polymer of each third film of each of the first and second environmentally-friendly composite foils for an internal surface of the environmentally friendly packaging.

20. The environmentally-friendly packaging of claim 19, wherein the polymeric article comprises: a condom, a glove, or a finger cot.

21. The environmentally-friendly packaging of claim 20, wherein the polymeric article is a condom and the internal chamber further comprises one or both of a lubricant and an anti-tack agent.

22. The environmentally-friendly packaging of claim 18, wherein the polymeric article is a condom and the internal chamber further comprises one or both of a lubricant and an anti-tack agent.

23. The environmentally-friendly composite foil of claim 14, wherein the metallized third film comprises a film having the following structure: a metallized surface, on which a moisture barrier coating is adhered, on which a cellulose film is attached, on which a moisture barrier heat-seal coating is disposed; and wherein the fourth film is a film having the following structure: a release wash-coat, on which a moisture barrier heat-seal coating is disposed, on which a cellulose film is attached, on which a moisture barrier heat-seal coating is disposed.

24. The environmentally-friendly composite foil of claim 7, wherein the ionically crosslinked polyethylene polymer comprises a copolymer of ethylene and methacrylic acid.

25. The environmentally-friendly composite foil of claim 14, wherein the ionically crosslinked polyethylene material comprises a copolymer of ethylene and methacrylic acid.

26. An environmentally-friendly packaging, comprising:
a first environmentally-friendly composite foil of claim 1; and
a second environmentally-friendly composite foil of claim 1 peripherally adhered to the first environmentally-friendly composite foil to define an internal chamber for storing a polymeric article between the first environmentally-friendly composite foil and the second environmentally-friendly composite foil, wherein the third biocompostable and/or biorenewable film comprising a sugar and/or a corn-based films each of the first and second environmentally-friendly composite foils form an internal surface of the environmentally friendly packaging.

* * * * *